United States Patent [19]

Minohara et al.

[11] 4,144,518

[45] Mar. 13, 1979

[54] STABILIZED-TRANSDUCER DRIVING DEVICE FOR UNDERWATER ULTRASONIC DETECTION SYSTEM

[75] Inventors: Kiyomi Minohara; Koichi Sonoda, both of Nishinomiya, Japan

[73] Assignee: Furuno Electric Co., Ltd., Nagasaki, Japan

[21] Appl. No.: 832,851

[22] Filed: Sep. 13, 1977

[30] Foreign Application Priority Data

Mar. 10, 1977 [JP] Japan .................................. 52-26650

[51] Int. Cl.$^2$ .......................... H04R 1/32; G01S 9/66
[52] U.S. Cl. .................................... 340/3 PS; 340/8 S
[58] Field of Search .............................. 340/3 PS, 8 S

[56] References Cited

U.S. PATENT DOCUMENTS

| 2,019,497 | 11/1935 | Kuntze | 340/3 PS |
| 3,518,676 | 6/1970 | Kirknes | 340/3 PS |
| 3,553,638 | 1/1971 | Sublett | 340/3 PS |
| 3,563,335 | 2/1971 | Holmes et al. | 340/3 PS |

*Primary Examiner*—Richard A. Farley
*Attorney, Agent, or Firm*—Sughrue, Rothwell, Mion, Zinn and Macpeak

[57] ABSTRACT

A gravity stabilized drive mechanism varies the orientation of an underwater ultrasonic transducer in both azimuth and elevation while stabilizing the transducer against the pitching and rolling of a ship. The transducer is freely suspended by a universal joint from a vertical tilt control shaft. The tilt control shaft passes through a hollow azimuth control shaft which, in turn, is rotatably mounted on a platform attached to the ship. Elevation of the transducer is adjusted by rotating the tilt control shaft, and azimuth of the transducer is adjusted by rotating the azimuth control shaft.

3 Claims, 3 Drawing Figures

STABILIZED-TRANSDUCER DRIVING DEVICE FOR UNDERWATER ULTRASONIC DETECTION SYSTEM

BACKGROUND OF THE INVENTION

This invention relates to an underwater ultrasonic wave detection system for detecting the presence and location of objects such as schools of fish and the sea bottom around a ship, and more particularly to a drive mechanism for varying the orientation of a transducer in both azimuth and elevation while stabilizing the transducer against the pitching and the rolling of a ship.

This type of equipment employs an electro-acoustic transducer for transmitting the sound energy and for receiving echoes from objects in the field under investigation. Conventional equipment projects the transducer downward under the keel of a ship to a scanning position and rotates the transducer about a vertical axis and/or a horizontal axis, whereby the face of the transducer and the sound beam emanating therefrom are oriented in any specific vertical and/or horizontal directions under the ship, as disclosed in the specification and drawings of a U.S. Pat. No. 2,759,783. Since the transducer 20 therein is rotatably attached to a lower end of a lift shaft 186 and is fixedly connected to the ship, the sound beam moves with the movement of the ship when the ship either rolls and/or pitches, thereby tending to introduce errors in ranging and locating objects.

Accordingly, an object of this invention is to stabilize the transducer, so that it is not subject to angular motion because of the rolling and pitching of the ship on which the equipment is mounted.

Prior art equipment, however, for merely stabilizing the transducer against the pitch and roll motion of a ship have been disclosed in U.S. Pat. No. 2,832,944 and in Japanese Utility Model publication Zitsukosho No. 47-6381. This type of equipment, however, includes a motion sensing device, such as a gyroscope, which produces output signals corresponding respectively to the number of degrees of roll and to the number of degrees of pitch. These output signals are fed through respective conventional amplifiers to a scan drive motor and a tilt drive motor so as to correct for the pitch and roll motion of the ship, thereby always enabling the face of the transducer to be oriented in a desired direction. Consequently, the prior art equipment, becomes relatively bulky and costly, and the requirement of a high-degree of technical knowledge and information in the manufacture, installment, adjustment and maintanance of the sophisticated prior art equipment makes inappropriate their use in smaller ships such as fishing vessels.

Accordingly, another object of the invention is to provide a transducer mounting, driving and stabilizing device wherein the transducer is mechanically driven and which is compactly constructed and which can maintain the face of the transducer and the sound beam oriented in any specific direction in spite of the pitching and rolling of the ship, whereby the foregoing disadvantages and drawbacks can be eliminated.

SUMMARY OF THE INVENTION

A transducer stabilizing mechanism embodied in the present invention operates in accordance with the principle that any force caused by the pitching and/or the rolling of a ship and exerted on a freely suspended transducer by a universal joint from a vertical shaft can be represented in magnitude and in direction as two component forces respectively directed in two mutually perpendicular directions, whereby the transducer freely moves in the two mutually perpendicular directions until the transducer aligns with the gravity vector and an equilibrium is established.

According to one aspect of the invention, a stabilized-transducer driving device comprises a platform having an opening and being fixedly connected to a ship so as normally to be maintained in parallel with the horizontal plane, a hollow azimuth control shaft which is rigidly mounted on said platform extending through the opening thereof, a tilt control shaft which is rotatably mounted on said azimuth control shaft extending through the hollow thereof, a tilt drive shaft which is pendulously suspended from said tilt control shaft by means of a universal joint, a transducer which is operably connected to said tilt drive shaft, tilt drive means for varying the tilt angle of said transducer with respect to the vertical axis of said tilt drive shaft in response to the rotational movement of said tilt control shaft, scan drive means for rotating said transducer about the vertical axis in response to the rotational movement of said azimuth control shaft, and means for aligning said transducer with the gravity vector.

DETAILED DESCRIPTION OF THE INVENTION

Figures 1A, 1B, 2:
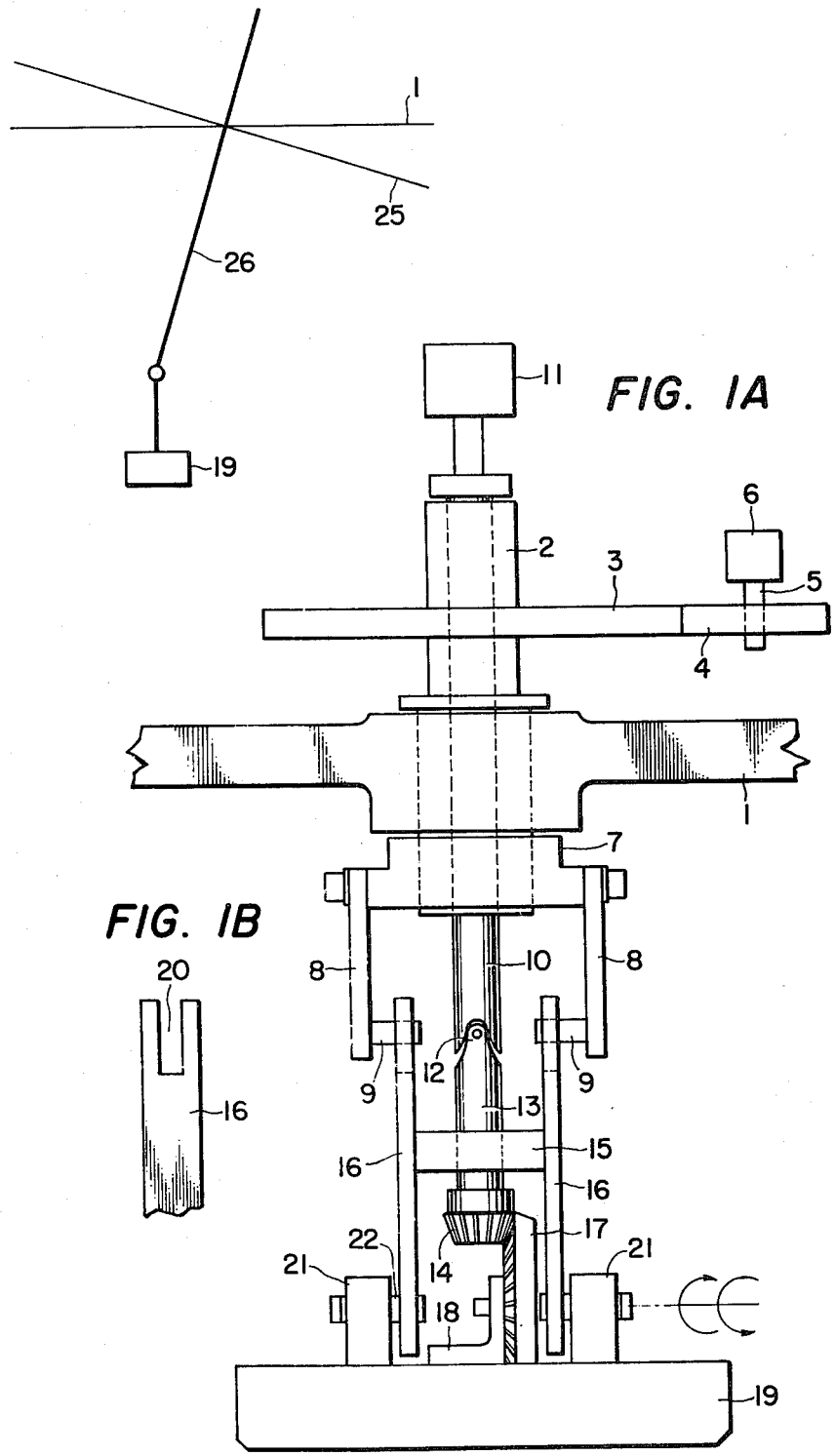
FIG. 1A shows a front elevation view, partly in section.
FIG. 1B is a detail of a stabilized-transducer driving device according to an embodiment of the present invention.
FIG. 2 shows an explanatory diagram for assistance in understanding the operation of the embodiment shown in FIG. 1.

Referring to FIG. 1, a platform 1 is rigidly fixed to the wall of a housing (not shown) in which the whole structure shown in the Figure is enclosed and which is rigidly attached to the lower end of a lift shaft being rigidly mounted on a ship at an upper part of the shaft, whereby the housing is kept projected under the keel of the ship and hence a transducer 19 is maintained at a scanning position. The platform 1 has an opening at its center through which a hollow azimuth control shaft 2 is extended and rotatably mounted thereon. A large diameter gear 3 is rigidly fixed at an upper part of the azimuth control shaft 2 and is meshed with a gear 4 which is fastened to a drive shaft 5 of a azimuth control motor 6. The azimuth control motor 6 is rigidly connected to the platform 1. At the lower end of the azimuth control shaft 2 is rigidly fixed a bracket 7 on which two guide plates 8 are symmetrically rigidly fixed. A guide pin 9 is fixed on each of the guide plates at its lower end.

A tilt control shaft 10 is operably connected to a tilt control motor 11, and the lower end thereof is connected via a universal joint 12 to a tilt drive shaft 13. To the lower end of the tilt drive shaft 13 is rigidly attached a bevel gear 14 which is meshed with a sector gear 17 which, in turn, is mounted by an angle 18 on the transducer 19. On the tilt drive shaft 13 is rotatably mounted a support bar 15 to the both ends of which suspension plates 16 are firmly fitted. The suspension plates 16 respectively have slots 20 at their upper ends so that the guide pins 9 freely move along the walls of the slots 20.

Shafts 22 are respectively journaled in the suspension plates at their lower ends and are also rigidly supported by support blocks 21 which are mounted on the transducer 19, so that the transducer 19 is pivotable around the common horizontal axis of the shafts 22. The universal joint 12 comprising two mutually perpendicular pins is so placed as the axis of a pin aligns with the horizontal axis of the guide pins 9, the transducer 19 is pivotable around the axis of the pin of the universal joint 12 and also pivotable around the axis of the other pin with the help of the vertical spaces for the guide pins 9 provided by the slots 20. The casing of the tilt control motor 11 is rigidly connected to the azimuth control shaft 2.

In order to vary the elevation angle of the transducer 19 with respect to a vertical axis, the tilt control motor 11 is driven so that the tilt control shaft 10, tilt drive shaft 13 and the bevel gear 14 are rotated, thereby the sector gear 17 is rotated about the common horizontal axis of the shafts 22. Thus, the transducer 19 is turned around the horizontal axis and is maintained at a desired elevation angle. In order to vary the azimuth angle of the transducer 19 around a vertical axis, the aximuth control motor 6 is driven so that a driving force is transmitted through the drive shaft 5, gear 4 and large gear 3 to the azimuth control shaft 2, thereby the hollow azimuth control shaft 2 is rotated, and the guide plates 8 and suspension plates 16 are turned around the vertical axis. Thus, the transducer 19 is rotated around the vertical axis and is maintained at a desired azimuth angle. This time the bevel gear 14, tilt drive shaft 13 and tilt control shaft 10 are also rotated, since the bevel gear 14 is meshed with the sector gear 17. By combining the two operations, the orientation of the face of the transducer and the scanning beam is controlled in any horizontal and/or vertical directions when both the azimuth and tilt control motors 6, 11 are simultaneously driven.

It is first assumed that the device shown in FIG. 1 is maintained in parallel with the pitch axis of the ship. Referring now to FIG. 2, if the ship's rolling causes an inclination of the platform 1 with respect to the horizontal plane as shown by a line 25, the tilt control shaft 10 also inclines against the vertical axis as shown by a line 26. The transducer 19, however, does not incline but aligns with the gravity vector since the transducer 19 as well as the tilt drive shaft 13 and suspension plates 16 are pendulously suspended from the tilt control shaft 10 at the universal joint 12 and the guide pins 9 are slidably movable in the slots 20.

Similarly, the ship's pitching causes an inclination of the platform 1 toward the bow or stern of the ship, which also inclines the tilt control shaft 10 against the vertical axis. The transducer 19 however does not incline but aligns with the gravity vector, since the transducer 19 as well as the tilt drive shaft 13 and suspension plates 16 turn around the horizontal axis of the universal joint pin which is in alignment with the axes of the guide pins 9. It is next assumed that the transducer 19 is rotated clockwise around the vertical axis by, for example, 45° with respect to the roll axis. An inclination of the platform 1 caused by rolling of the ship exerts on the transducer a force which can be represented by two component forces directed in two mutually perpendicular directions one of which is directed in the 45° direction with respect to the roll axis. Thus, the transducer 19 turns around the respective axes of the two pins of the universal joint 12, which enables the transducer to align with the gravity vector. In the same manner, the transducer 19 can be stabilized irrespective of its azimuth angle against the pitch and/or roll motion of the ship. Further, as easily understood, the transducer 19 is maintained in alignment with the gravity vector, and hence stabilized, even when the tilt control motor 11 is driven and the tilt control shaft 10 and tilt drive shaft 13 are rotated to change the tilt angle of the transducer. Accordingly, the face of the transducer 19 and the scanning beam can be oriented in any desired direction in both azimuth and elevation by controlling the azimuth and tilt control motors and can be maintained oriented in the same direction irrespective of the pitch and/or roll motion of a ship.

As described, above, according to this invention a stabilized-transducer driving device which is compactly constructed and mechanically driven can be manufactured, whereby a high-degree technical knowledge and information is not required for its manufacture, installment, ajustment and maintenance, thus enabling its use in smaller vessels.

What is claimed is:

1. A stabilized-transducer driving device suitable for underwater ultrasonic detection system comprising
   (a) a platform having an opening and adapted to be fixedly connected to a ship so as normally to be maintained in parallel with the horizontal plane,
   (b) a hollow azimuth control shaft which is rigidly mounted on said platform extending through the opening thereof,
   (c) a tilt control shaft which is rotatably mounted on said azimuth control shaft extending through the hollow thereof,
   (d) a tilt drive shaft which is pendulously suspended from said tilt control shaft by a universal joint,
   (e) a transducer which is operably connected to said tilt drive shaft,
   (f) tilt drive means for varying the tilt angle of said transducer with respect to the vertical axis of said tilt drive shaft in response to the rotational movement of said tilt drive shaft, and
   (g) scan drive means for rotating said transducer about the vertical axis in response to the rotational movement of said azimuth control shaft, whereby said pendulous suspension permits said transducer to align itself with the gravity vector.

2. A stabilized-transducer driving device as defined in claim 1, wherein the tilt drive means comprises a bevel gear rigidly attached to the end of said tilt drive shaft, a sector gear which is mounted on said transducer and which is meshed with said bevel gear, and suspending means for suspending said transducer from said tilt drive shaft so as to permit said transducer to turn around the horizontal axis of said sector gear.

3. A stabilized-transducer driving device as defined in claim 1, wherein said scan drive means comprises two guide pins which are rigidly connected to said azimuth control shaft and the axes of said guide pins are in alignment with the axis of a pin of said universal joint, and two suspension plates rotatably connected to said tilt drive shaft having slots in which said guide pins move.

* * * * *